US008754939B2

(12) United States Patent
Oggier et al.

(10) Patent No.: US 8,754,939 B2
(45) Date of Patent: Jun. 17, 2014

(54) MULTISTAGE DEMODULATION PIXEL AND METHOD

(75) Inventors: Thierry Oggier, Zurich (CH); Michael Lehmann, Winterthur (CH); Bernhard Buettgen, Adliswil (CH); Jonas Felber, Niederbipp (CH)

(73) Assignee: MESA imaging AG, Zurich (CH)

(*) Notice: Subject to any disclaimer, the term of this patent is extended or adjusted under 35 U.S.C. 154(b) by 533 days.

(21) Appl. No.: 12/942,598

(22) Filed: Nov. 9, 2010

(65) Prior Publication Data

US 2011/0273561 A1 Nov. 10, 2011

Related U.S. Application Data

(60) Provisional application No. 61/259,333, filed on Nov. 9, 2009.

(51) Int. Cl.
*H04N 7/18* (2006.01)
*H04N 9/47* (2006.01)

(52) U.S. Cl.
USPC ............ 348/135; 348/E05.091; 348/E07.085; 250/214 P

(58) Field of Classification Search
USPC ......... 348/135, E05.091, E07.085; 250/214 P
See application file for complete search history.

(56) References Cited

U.S. PATENT DOCUMENTS 5,856,667 A * 1/1999 Spirig et al. ............... 250/208.1
6,825,455 B1 11/2004 Schwarte
7,498,621 B2 * 3/2009 Seitz ............................. 257/222
2006/0108611 A1 * 5/2006 Seitz ............................. 257/222
2008/0079833 A1 * 4/2008 Ichikawa et al. .............. 348/311
2008/0239466 A1 * 10/2008 Buettgen ....................... 359/325
2009/0224139 A1 * 9/2009 Buettgen et al. ........... 250/208.1
2010/0053405 A1 3/2010 Lehmann et al.

FOREIGN PATENT DOCUMENTS

DE 4440613 C1 * 7/1996
DE 197 04 496 A1 3/1998
EP 1 624 490 A1 2/2006
GB 2 389 960 A 12/2003
WO 2007/045108 A1 4/2007
WO 2010/025331 A1 3/2010

OTHER PUBLICATIONS

International Preliminary Report on Patentability dated May 24, 2012 from counterpart International Application No. PCT/US2010/055979, filed Nov. 9, 2010.

Acharya, S. et al., "System Design of Time-of-Flight Range Camera for Car Park Assist and Backup Application," CVPR workshop, 2008, 6 pages.

Ay, S., "A Hybrid CMOS APS Pixel for Wide-Dynamic Range Imaging Applications," IEEE International Symposium on Circuits and Systems, May 2008, pp. 1628-1631.

(Continued)

*Primary Examiner* — Christopher S Kelley
*Assistant Examiner* — Ana Picon-Feliciano
(74) *Attorney, Agent, or Firm* — Houston & Associates, LLP

(57) ABSTRACT

A demodulation structure for a n-tap pixel, mainly for 3D time-of-flight (TOF) applications uses a 2-stage switch structure for demodulating a modulated electromagnetic wave. An almost arbitrary number of storage sites per pixel can be implemented enabling an almost arbitrary number of samplings captured during one exposure. It also provides the option to demodulate and integrate different phasing samples according to the different modulation frequencies within the same exposure.

17 Claims, 5 Drawing Sheets

(56) References Cited

OTHER PUBLICATIONS

Buettgen, B. et al., "CDD/CMOS Lock-In Pixel for Range Imaging: Challenges, Limitations and State-of-the-Art," 1st Range Imaging Days, ETH Zurich, 2005, 12 pages.
Buettgen, B. et al., "Demonstration of a Novel Drift Field Pixel Structure for the Demodulation of Modulated Light Waves with Application in Three-Dimensional Image Capture," Proceedings of the SPIE, Apr. 1, 2004, pp. 9-20, vol. 5302, SPIE, Bellingham, VA.
Gokturk, S.B. et al., "A Time-of-Flight Depth Sensor—System Description, Issues and Solutions," CVPR 04, vol. 3, p. 35.
Hagebeuker, B., "Mehrdimensionale Objekterfassung mittles PMD Sensorik," ("Multi-Dimensional Object Detection Medium PMD Sensor"), Optik & Photonik, Mar. 2008, 3 pages.
Kawahito, S. et al., "A CMOS Time-of-Flight Range Image Sensor with Gates-on-Field-Oxide Structure," IEEE Sensors Journal, Dec. 2007, pp. 1578-1586, vol. 7, No. 12.
Lange, R. et al., "Solid-State Time-of-Flight Range Camera," IEEE J. Quantum Electronics, Mar. 2001, pp. 390-397, vol. 37, No. 3.
Lange, R. et al., "Time-of-flight range imaging with a custom solid-state image sensor," Laser Metrology and Inspection, Proc. SPIE, 1999, vol. 3823, Munich.
Moeller, T. et al., "Robust 3D Measurement with PMD Sensors," 1st Range Imaging Research Day, ETH Zurich, 2005.
Oggier, T. et al., "An all-solid-state optical range camera for 3D real-time imaging with sub-centimeter depth resolution (SwissRanger TM)," Optical Design and Engineering, Proceedings of the SPIE, 2004, pp. 534-545, vol. 5249.
Oggier, T. et al., "SwissRanger SR3000 and First Experiences Based on Miniaturized 3D-TOF Cameras," 1st Range Imaging Research Day, ETH Zurich, 2005, 12 pages.
Schwarte, R. et al., "A new electrooptical mixing and correlating sensor: Facilities and Applications of the Photonic Mixer Device (PMD)," Proc. SPIE Sep. 1997, pp. 245-253, vol. 3100.
Spirig, T. et al., "The Lock-In CCD—Two-Dimensional Synchronous Detection of Light," IEEE Journal of Quantum Electronics, Sep. 1995, pp. 1705-1708, vol. 31, No. 9.
Ushinaga, T. et al., "A QVGA-size CMOS Time-of-Flight Range Image Sensors With Background Light Charge Draining Structure," Three-Dimensional Image Capture and Applications VII, Proceedings of SPIE, Jan. 2006, pp. 34-41, vol. 6056.
Van Nieuwenhove, D. et al., "Novel Standard CMOS Detector using Majority Current for guiding Photo-Generated Electrons towards Detecting Junctions," Proceedings Symposium IEEE/LEOS Benelux Chapter, 2005.
International Search Report mailed Mar. 15, 2011, from counterpart International Application No. PCT/US2010/055979, filed on Nov. 9, 2010.

* cited by examiner

MULTISTAGE DEMODULATION PIXEL AND METHOD

RELATED APPLICATIONS

This application claims the benefit under 35 USC 119(e) of U.S. Provisional Application No. 61/259,333, filed on Nov. 9, 2009, which is incorporated herein by this reference in its entirety.

BACKGROUND OF THE INVENTION

The demodulation of modulated light signals at the pixel level requires in current approaches, the switching of a photo-generated charge current. Basically, both electron as well as hole currents are possible. The common methods use the photo-generated electron currents due to their higher mobility in the semiconductor material. Some pixel architectures do the necessary signal processing based on the photo-charge currents whereas other architectures work in the charge domain.

Common to all pixels is the necessary transfer of photo-charges through the photo-sensitive detection region to a subsequent storage area or to a subsequent processing unit. In the case of charge-domain based pixel architectures, the photo-charge is generally transferred to a storage node. In order to demodulate an optical signal, the pixel has to have at least two integration nodes that accumulate the photo-generated charges during certain time intervals.

Different pixel concepts have been realized in the last few decades. U.S. Pat. No. 6,825,455 to Schwarte introduced a demodulation pixel, which transfers the photo-generated charge below a certain number of adjacent poly-silicon gates to discrete accumulation capacitances. U.S. Pat. No. 5,856,667 to Spirig et al. disclosed a CCD lock-in concept that allows the in-pixel sampling of the impinging light signal with theoretically an arbitrary number of samples. Another similar pixel concept has been demonstrated by T. Ushinaga et al., "A QVGA size CMOS time-of-flight range image sensor with background light charge draining structure", Three-dimensional image capture and applications VII, Proceedings of SPIE, Vol. 6056, pp. 34-41, 2006, where a thick field-oxide layer is used to smear the potential distribution below the demodulation gates.

A common problem of the afore-mentioned pixel approaches is the slowness of the photo-charge transport through the semiconductor material. This decreases significantly the accuracy of the in-pixel demodulation process. In all pixel structures, the limiting transport speed is the step-wise potential distribution in the semiconductor substrate that is used to transport the charges through the semiconductor in lateral direction. In those configurations, thermal diffusion dominates the transport speed instead of the fast movement by lateral electric drift fields.

New concepts of pixels have been explored in the last years accelerating the in-pixel transport of the charges by exploiting lateral electric drift fields. Seitz disclosed in U.S. Pat. No. 7,498,621 a first drift field demodulation device that is based on a very high-resistive poly-silicon gate electrode. It even allows the design of pixels having an arbitrary number of samples. Van Nieuwenhove et al., in "Novel Standard CMOS Detector using Majority Current for guiding Photo-Generated Electrons towards Detecting Junctions", Proceedings Symposium IEEE/LEOS Benelux Chapter, 2005, introduced another drift field pixel, where a drift field in the substrate is generated by the current of majority carriers. To perform demodulation of photo-generated minority carriers, the majority current is dynamically controlled by the modulation signal.

The aforementioned drift field pixel concepts, however, have two drawbacks: First, the demodulation requires the switch of large capacitances since the whole sensitive area needs to be controlled. Second, an electronic current is used to generate the drift fields, which leads to a significant in-pixel power consumption.

An alternative pixel concept is described as the static drift field pixel and is disclosed in US 2008/0239466 A1 by Buettgen, which overcomes these two problems. In contrast to the architectures mentioned above, it clearly separates the detection and the demodulation regions within the pixel. It shows lower power consumption and, at the same time, it supports fast in-pixel lateral charge transport and demodulation.

One major application of demodulation pixels is found in real-time 3-D imaging. By demodulating the optical signal and applying the discrete Fourier analysis on the samples, parameters such as amplitude and phase can be extracted for the frequencies of interest. If the optical signal is sinusoidally modulated, the extraction based on at least three, but most commonly implemented four discrete samples will lead to the offset, amplitude and phase information. The phase value corresponds proportionally to the sought distance value. Such a harmonic modulation scheme is often used in real-time 3-D imaging systems incorporating the demodulation pixels.

Depending on the above-mentioned pixel architectures that is used to build the high-speed charge transfer, there are limitations in building a pixel enabling the sampling of four times and to store those four values. State-of-the-art pixel architectures, however, can only sample the two opposition phases. Hence, only two samples can be stored by one acquisition. At least a second acquisition is required to be able to reconstruct phase, amplitude and offset of the modulation light.

SUMMARY OF THE INVENTION

All afore-mentioned pixel designs describe specific implementations to get a fast charge transfer out of the photo-sensitive area into a storage site. However, another main challenge in the pixel design is to be able to sample at least three, preferably four times per period and store these samples in the pixel. Therefore, there have to be at least three or even four high-speed channels transferring the photo-charges quickly from the photo-sensitive area into the corresponding three or more storage sites. For the facilitation of design layout, most pixels today implement only one switch transferring the photo-generated electrons to either one of the two storage sites. Hence, at least one additional image has to be captured in order to get enough samples to reconstruct the depth information.

Carrying out two or more exposures sequentially renders measurement artifacts on fast moving parts in the captured scene. Such moving objects might be somewhere in the scene during the first image acquisition, but will be displaced while acquiring the second image. The process of deriving the depth information from the two acquired images results in an inaccurate depth map.

The presented invention reduces these motion artifacts by appropriate pixel design and acquisition method.

Furthermore, the disclosed pixel architecture allows applying different modulation frequencies in the same exposure and storing samplings of these in the dedicated storage sites. This approach provides the possibility to use completely new demodulation schemes showing improved performance in ambiguity-range or in resolution for e.g. sine modulated system.

In general, according to one aspect, the invention features a demodulation pixel comprising a photosensitive area in which photo-charges are generated, a first stage switch for switching the photo-charges from the photosensitive area between a first second stage switch and a second second stage switch, a first set of storage sites for receiving photo-charges from the first second stage switch, and a second set of storage sites for receiving photo-charges from the second second stage switch.

In embodiments, the photosensitive area includes a lateral drift field for transferring the photo-charges in the photosensitive area toward the first stage switch. This lateral drift field is usually generated by a gate structure and/or or a majority current and/or a pinned photodiode and/or a built-in drift field.

The photo-charges are alternately transferred by the first stage switch between to a first channel that leads to the first second stage switch and a second channel that leads to the second second stage switch, in embodiments. In some cases, a first intermediate storage is provided for receiving the photo-charges from the first stage switch before transfer to the first second stage switch and a second intermediate storage is provided for receiving the photo-charges from the first stage switch before transfer to the second second stage switch.

In a preferred embodiment, a dump node is provided that receives photo-charges from the first stage switch.

In some embodiments, the first stage switch is implemented in the photosensitive area. In other embodiments, the photosensitive area includes a static drift field.

In one implementation, a time of flight camera comprises an array of the demodulation pixels as described above and a light emitter for illuminating a scene with the modulated light that is detected by the array. In some embodiments, the modulated light is modulated with two or more frequencies.

In general, according to another aspect, the invention features a method for analyzing a scene. This method comprises generating modulated light directed at the scene, detecting the modulated light in photosensitive areas in which photo-charges are generated, switching the photo-generated charges from the photosensitive areas between a first second stage switches and a second second stage switches, receiving photo-charges from the first second stage switches in a first set of storage sites and receiving photo-charges from the second second stage switches in a second set of storage sites.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
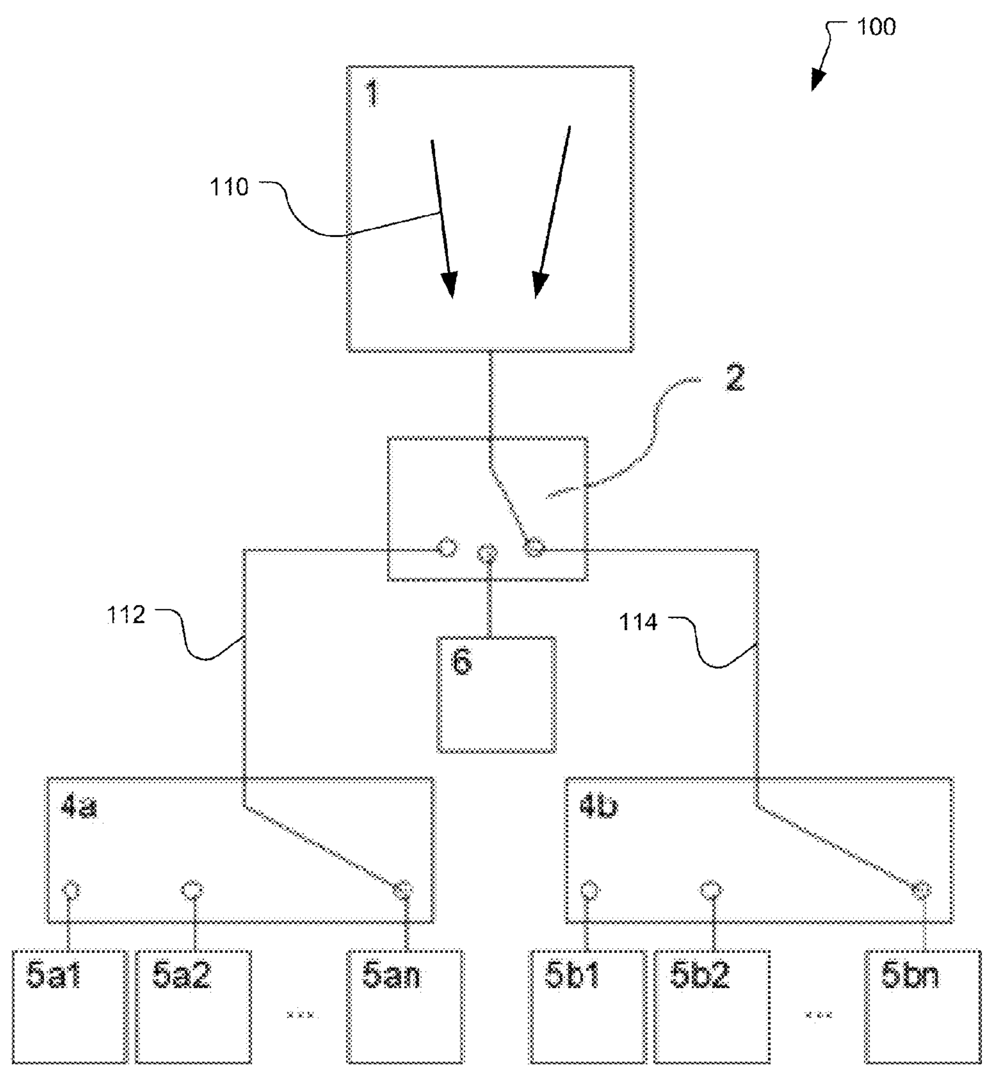
FIG. 1 is a block diagram of a demodulation pixel including photo-sensitive area and two stages of switches and the integration sites according to the present invention.
Figure 2:
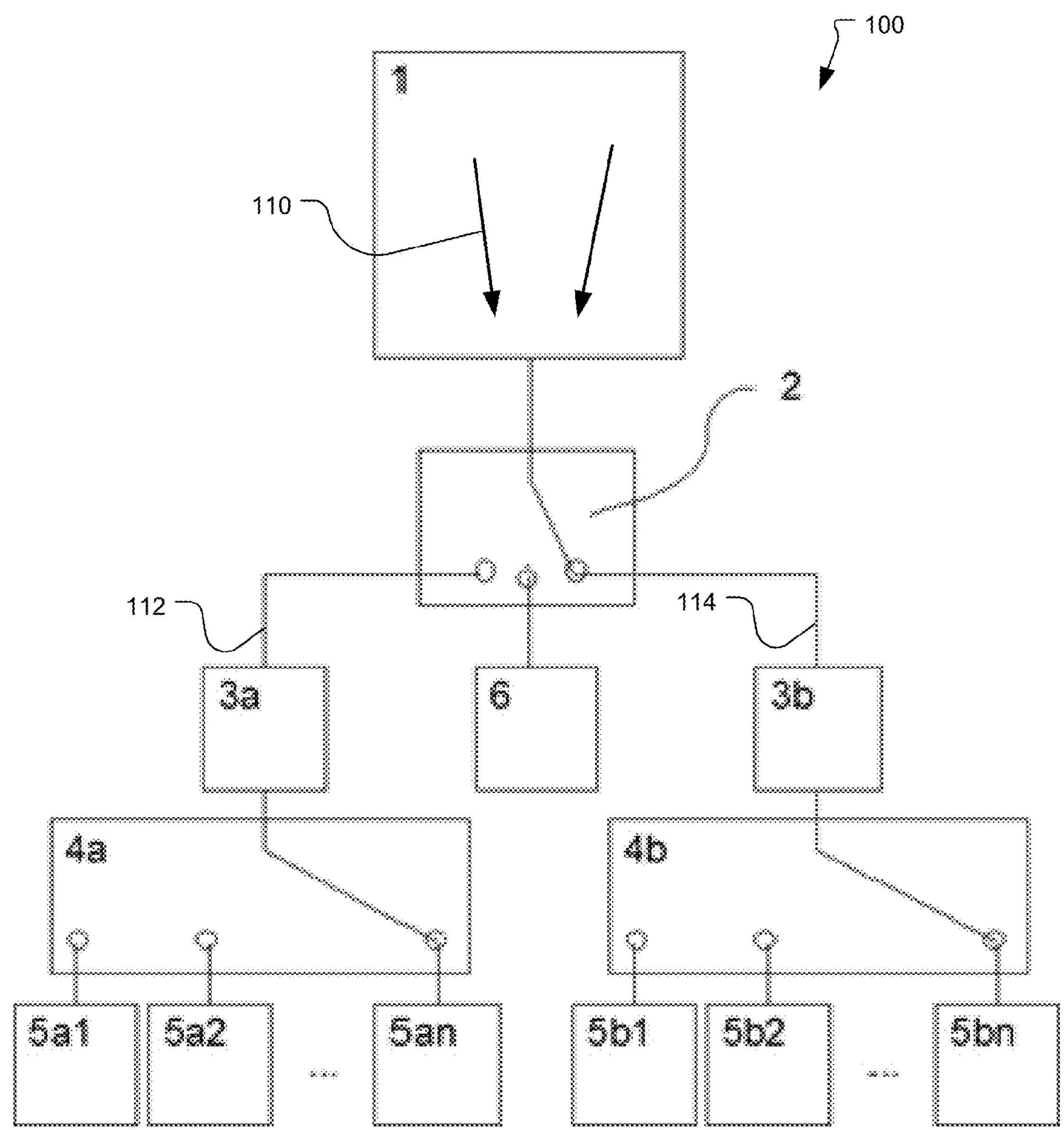
FIG. 2 is a block diagram of demodulation pixel including photo-sensitive area and two stages of switches and the integration sites and also including temporary or intermediate storage sites between the two switching stages according to the present invention.

FIGS. 1 and 2 illustrate to demodulation pixels 100 that have been constructed according to the principles of the present invention.

The disclosed pixels 100 include at least one photo-sensitive area 1 that transfers the photo-charges quickly out of the photo-sensitive area. For this fast charge transport, a number of mechanisms are used in different implementations to generate a lateral drift field 110. In one implementation, the fast charge transport is provided by a series of gates or resistive gates as described in US 2008/0239466 A1, which is incorporated herein by this reference in its entirety. In another implementation, a pinned photo diode structure is used. In still other implementations, majority currents in the substrate or built-in drift fields are used. Still other mechanisms are possible. The key functionality is that photo-charges generated in the photosensitive area are transported in the direction of arrow 110 such as by a lateral drift field that is either static or modulated.

The photo-sensitive area 1 is connected to a first stage switch 2 that steers the photo-charges into channel 112 or channel 114. This first switch 2 allows a first sampling stage of the incoming signal.

Two second sampling stages 4*a*, 4*b* follow the first stage 1 for each of the channels 112, 114. For example, a first second stage switch 4*a* steers the charges from channel 112 into at least two dedicated integration sites 5*a*1, 5*a*2 to 5*an*. The second second stage switch 4*b* for channel 114 steers the charges from channel 114 into physically separated integration sites 5*b*1, 5*b*1 to 5*bn*. In some embodiments, n is four or 6 or more.

Furthermore, it is preferable that the first stage switch 2 is connected to a dump node 6 as well. This dump node allows for the flushing of photo-generated charges from the photo-sensitive region 1. This is usually done to initialize the device.

FIG. 2 differs from FIG. 1 in that in further includes two temporary storage sites 3*a* and 3*b* on channels 112, 114 respectively to temporary store charges between first switching stage 2 and the secondary switches 4*a* and 4*b*.

The described pixel architecture enables the implementation of four or more samplings during the same image exposure, and therefore is able to deduce the full depth information based on one single exposure. Furthermore, an almost arbitrary number of samples are possible adding more integration sites to the pixels 100. Being able to store more than two samples in the pixel results in reduced artifacts caused by fast changing scenes, since all the samples are captured in the same exposure.

The same pixel architecture furthermore enables the acquisition and storage of sample on several modulation frequencies, such as two or three or more, within the same exposure. In this case, the integration sites are allocated to any given sampling for any applied modulation frequency. During exposure, the modulation frequency is changed, in one example, after a certain number of periods while always steering photo-generated charges at a given sampling and modulation frequency to the appropriate integration site 5*a*, 5*b*.

By emitting and sampling more than one modulation frequency during one exposure, the ambiguity range of the distance measurement is increased while still having almost the same accuracy.

Adding more integration sites in general requires more in-pixel electronics, which causes a reduction of the fill factor of the pixel. A decrease of the fill factor leads to a loss in sensitivity. This sensitivity loss can be compensated using micro-lenses to project the impinging light onto the photo-sensitive area. Another possible approach to avoid a loss in sensitivity is to use back-side illuminated technology and steer all photo-generated charges into the 1st stage switch.

Figure 3:
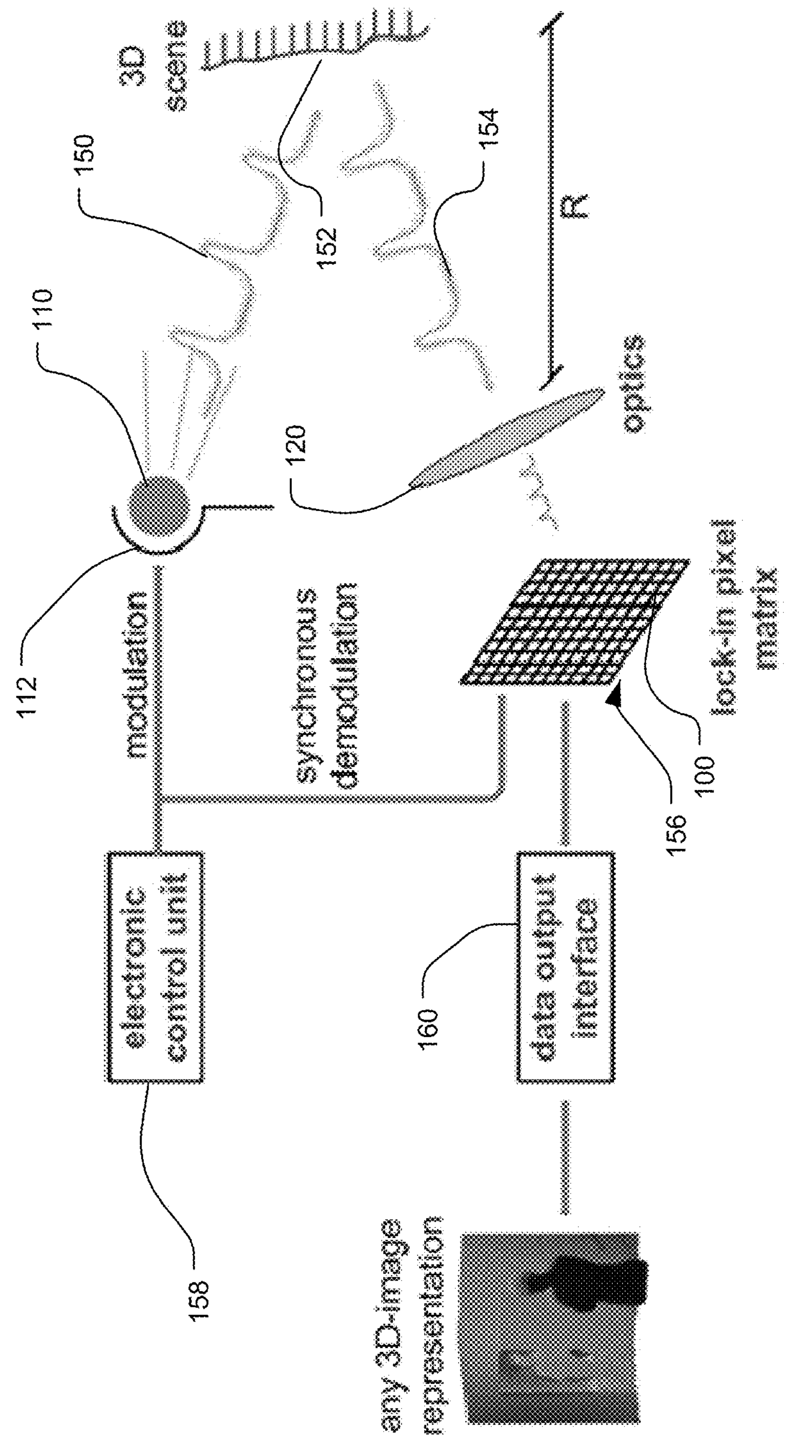
FIG. 3 is a schematic illustration showing the operation of a TOF camera using a detector that includes the inventive demodulation pixels.

FIG. 3 shows the typical application of a 3D TOF camera.

In more detail, the light emitter 110 with a reflector 112 produces modulated light 150 that is directed at the 3-D scene 152. The returning light 154 from the scene 152 is collected by the camera lens 120, which typically includes a bandpass filter so that only light at the wavelength emitted by the light emitter 110 is transmitted. An image is formed on the TOF detector chip 156 which is a two dimensional array of pixels 100. Control electronics 158 coordinate the modulation of the light emitter 110 with the sampling of the TOF detector chip 156. This results in synchronous demodulation. A data output interface 160 is then able to reconstruct the 3-D image representation using the samples generated by the chip 156 such that a range to the scene is produced for each of the pixels 100 of the chip 156.

Figure 4A:
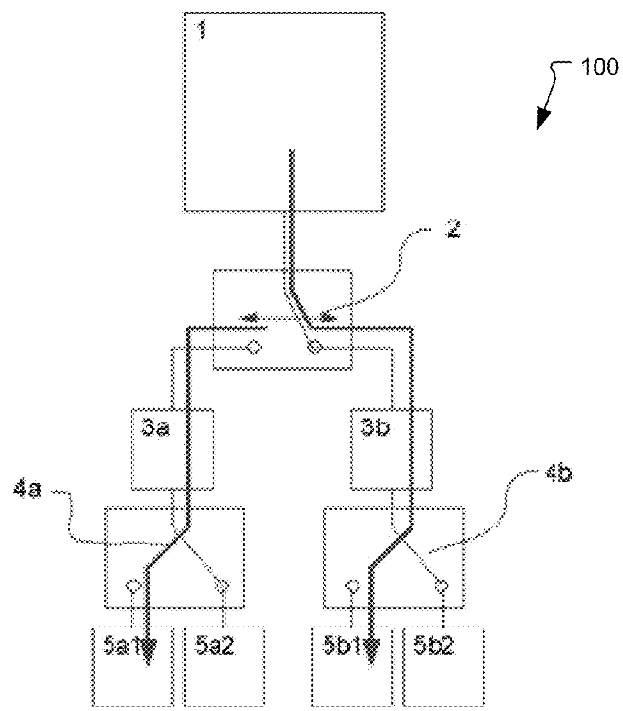
FIGS. 4A and 4B are block diagrams of the demodulation pixel configured for demodulation of a sinusoid modulated light.
Figure 4B:
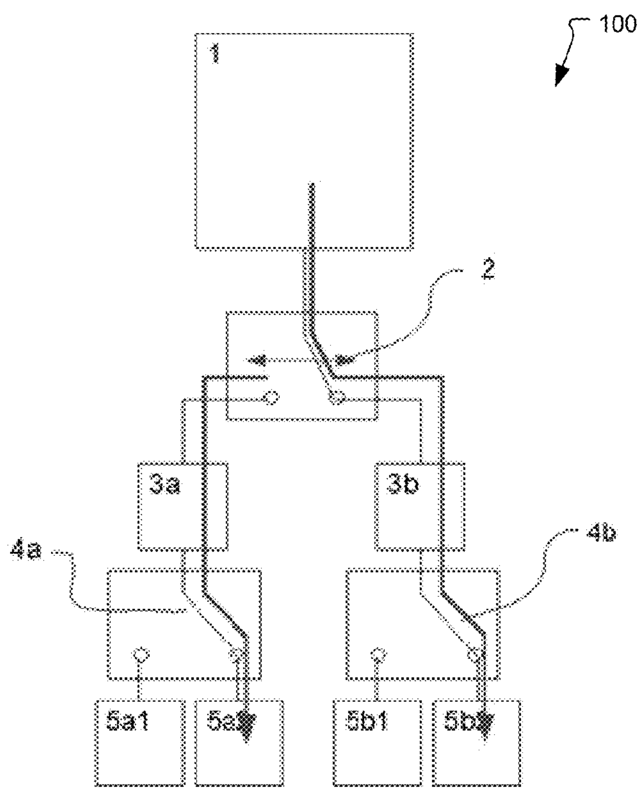

FIGS. 4A and 4B show the switching used for a sine wave modulation of the light emitter.

In a first step, the first stage switch 2 samples at the phasing 0 degrees and 180 degrees with respect to the emitted light modulation from the light emitter 110. In this fast switching mode, the first stage switch 2 steers the photo-generated charges into either the storage site 3*a* (e.g. phasing 0 degrees) or 3*b* (e.g. phasing 180 degrees). At the same time, the second stage switches 4*a* and 4*b* are set to transfer the charges into the integration gates 5*a*1, respectively 5*b*1. FIG. 4A shows this situation. Several periods up to a few thousands or even more are usually integrated in the two integration gates 5*a*1 and 5*b*1.

In a second step, the second stage switches 5 are reversed and now the charges are transferred into integration sites 5*a*2, 5*b*2 respectively. At the same time, the first stage switch is now phase-shifted with respect to the illumination by 90 degrees. The integrated charges in 5*a*2 and 5*b*2, therefore, correspond now to the samplings 90 degrees and 270 degrees. This situation is shown in FIG. 4B. This sampling and integration will be repeated the same number of periods as the first step.

Step 1 and 2 can be repeated several times, up to more than a thousand, in order to get an appropriate amount of charges for the phase evaluation.

The four integrated samplings are read out and processed to get phase, amplitude and/or offset information for the light that detected from the scene 152 from the light emitter 110.

Typical switching frequencies of the first stage switch 2 are currently few tens of MHz up to 1 GHz In a second embodiment, the pixel has the same elements as described in the first embodiment. In addition, there is a dump node 6 connected to the 1st stage switch 2 that further allows removing photo-generated charges during cycles where only background light is present. This is typically the case during imager readout or between pulses if the camera is operated in burst mode modulation schemes.

In a third possible embodiment, the exposure is subdivided into smaller sub-exposures. In such an embodiment, the number of storage sites is (n) is at least 4, see FIG. 1. In the first sub-exposure, a modulation frequencies F1 is emitted from the emitter 110, demodulated and stored in the dedicated integration sites 5*a*1, 5*a*2, 5*b*1, 5*b*2 as shown in FIG. 1. In the second sub-exposure, a second modulation frequency F2 is emitted, demodulated and stored on other dedicated storage sites, 5*a*3, 5*a*4, 5*b*3, 5*b*4. The two sub-exposures typically repeated several times during the full exposure. At the end of the exposure, the samplings captured during for F1 modulation and during F2 modulation are readout and evaluated by the data output interface 160. F1 and F2 are chosen in such a way, that the processing of their resulted samplings enable to increase the ambiguity range and/or enable to improve depth resolution.

Figure 5A:
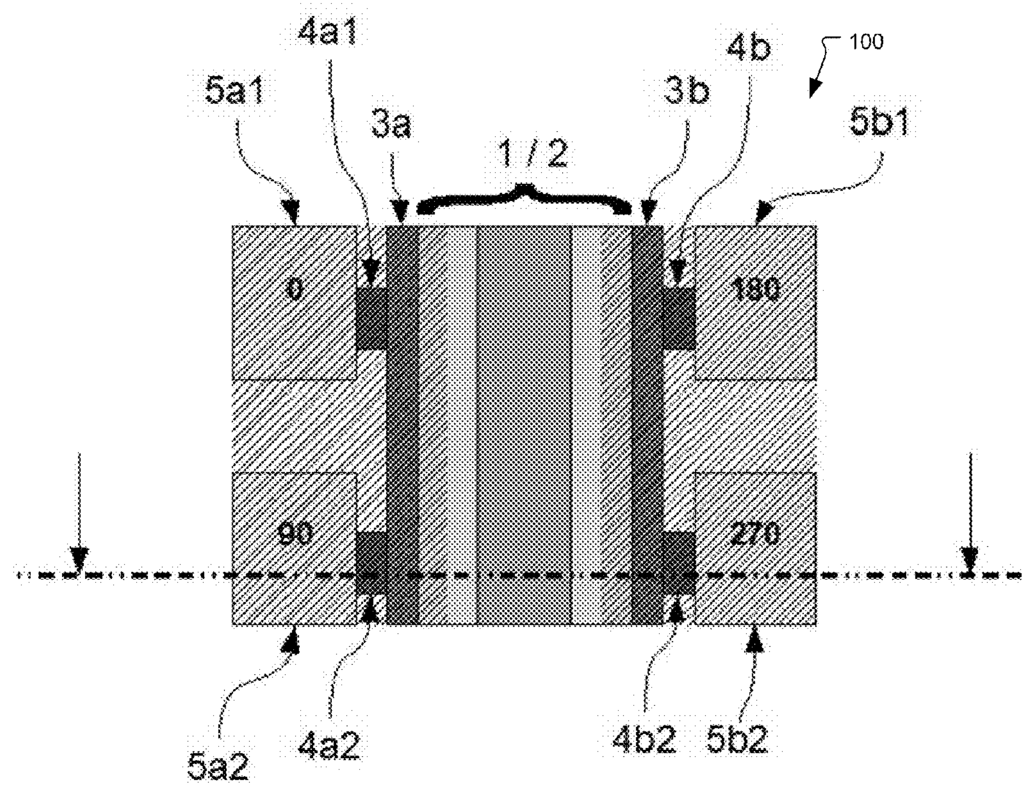
FIGS. 5A and 5B are a top plan view and a side cross sectional view showing another embodiment that includes a combined first switching stage and photosensitive area.
Figure 5B:
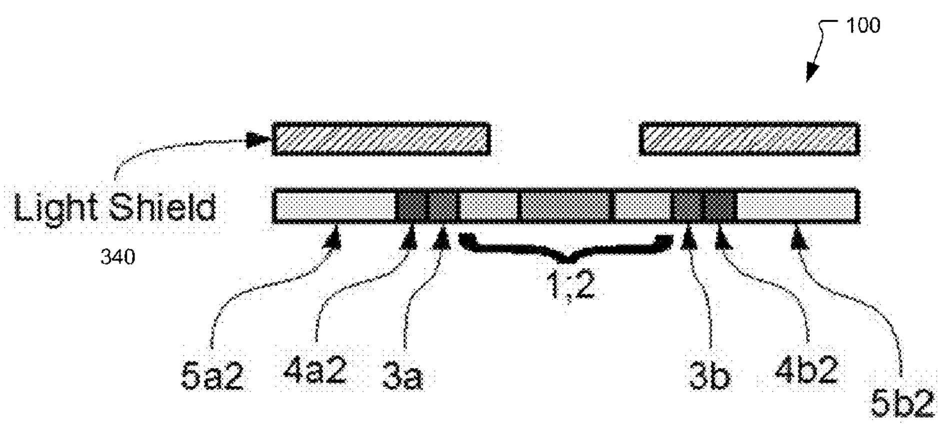

FIGS. 5A and 5B show another possible embodiment that includes the first switching stage 2 in the photosensitive area 1. In this design, photo-generated charge carriers are not first transferred to an input point for the first switching stage 2, but are already sampled and appropriately transferred from the photo-sensitive area 1 directly to one of the intermediate storage sites 3*a*, 3*b* attached to the photo-sensitive area 1. A light shield 340 defines the portion of the substrate that is exposed to the incoming modulated light.

The intermediate or temporary storage sites 3*a*, 3*b* are located at two sides of the photo-sensitive area 1 and the applied control signals are alternating to do sampling. From the intermediate storage nodes 3*a*, 3*b*, a lower speed transfer is used to steer the electrons by the switching means 4*a*, 4*b* respectively, to the appropriate storage site 5*a*1, 5*a*2, 5*b*1, 5*b*2 respectively.

The high-speed sampling process happens in the photo-sensitive area 1 by switching the electrical field below the photo-sensitive area 1 appropriately. Sampling frequencies of a few 100 MHz are possible with this type of demodulation device. In another variation of this fourth embodiment, the high-speed sampling in the photo-sensitive area is implemented, for example, by applying majority current.

While this invention has been particularly shown and described with references to preferred embodiments thereof, it will be understood by those skilled in the art that various changes in form and details may be made therein without departing from the scope of the invention encompassed by the appended claims.

What is claimed is:

1. A demodulation pixel, comprising:

a photosensitive area in which photo-charges are generated;

a first stage switch for switching the photo-charges from the photosensitive area between a first second stage switch and a second second stage switch;

a first set of storage sites for receiving photo-charges from the first second stage switch; and a second set of storage sites for receiving photo-charges from the second second stage switch.

2. A pixel as claimed in claim 1, wherein the photosensitive area includes a lateral drift field for transferring the photo-charges in the photosensitive area toward the first stage switch.

3. A pixel as claimed in claim 1, wherein the lateral drift field is generated by a gate structure or a majority current or a pinned photodiode or a built-in drift field.

4. A pixel as claimed in claim 1, wherein the first stage switch directs the photo-charges alternately between to a first channel that leads to the first second stage switch and a second channel that leads to the second second stage switch.

5. A pixel as claimed in claim 1, further comprising a first intermediate storage for receiving the photo-charges from the first stage switch before transfer to the first second stage switch and a second intermediate storage for receiving the photo-charges from the first stage switch before transfer to the second second stage switch.

6. A pixel as claimed in claim 1, further comprising a dump node that receives photo-charges from the first stage switch.

7. A pixel as claimed in claim 1, wherein the first stage switch is implemented in the photosensitive area.

8. A pixel as claimed in claim 1, wherein the photosensitive area includes a static drift field.

9. A time of flight camera comprising:

an array of the demodulation pixels as claimed in claim 1 for detecting modulated light; and a light emitter for illuminating a scene with the modulated light.

10. A camera as claimed in claim 9, wherein the light emitter generates the modulated light with a sinusoid modulation.

11. A camera as claimed in claim 9, wherein the light emitter generates modulated light with two modulation frequencies.

12. A camera as claimed in claim 11, wherein the first set of storage sites comprises at least four storage sites and the second set of storage sites comprises at least more four storage sites.

13. A method for analyzing a scene, comprising:

generating modulated light directed at the scene;

detecting the modulated light in photosensitive areas in which photo-charges are generated;

switching the photo-charges from the photosensitive areas between first second stage switches and second second stage switches with first stage switches for the photosensitive areas;

receiving photo-charges from each of the first second stage switches in a first set of storage sites; and receiving photo-charges from each of the second second stage switches in a second set of storage sites.

14. A method as claimed in claim 13, further comprising generating a lateral drift field in the photosensitive areas for transferring the photo-charges in the photosensitive areas toward the first stage switches.

15. A method as claimed in claim 13, wherein the first stage switches direct the photo-charges alternately between first channels that lead to the first second stage switches and second channels that lead to the second second stage switches.

16. A method as claimed in claim 13, further comprising providing first intermediate storage sites for receiving the photo-charges from the first stage switches before transfer to the first second stage switches and second intermediate storage sites for receiving the photo-charges from the first stage switches before transfer to the second second stage switches.

17. A method as claimed in claim 13, further comprising dumping the photo-charges from the first stage switch.

* * * * *